(12) United States Patent
Junkel et al.

(10) Patent No.: US 7,806,388 B2
(45) Date of Patent: Oct. 5, 2010

(54) HANDHELD WATER MISTING FAN WITH IMPROVED AIR FLOW

(76) Inventors: Eric Junkel, 1602 E. Linden La., Mt. Prospect, IL (US) 60056; Yung Chen, 3 Larkspur La., Clarendon Hills, IL (US) 60514

(*) Notice: Subject to any disclaimer, the term of this patent is extended or adjusted under 35 U.S.C. 154(b) by 860 days.

(21) Appl. No.: 11/728,985

(22) Filed: Mar. 28, 2007

(65) Prior Publication Data

US 2008/0237900 A1 Oct. 2, 2008

(51) Int. Cl.
*B01F 3/04* (2006.01)
(52) U.S. Cl. .............................. 261/28; 261/89; 239/289
(58) Field of Classification Search ................... 261/28, 261/89, 90, DIG. 3, DIG. 43; 239/289, 290
See application file for complete search history.

(56) References Cited

U.S. PATENT DOCUMENTS

| 2,076,192 A | * | 4/1937 | Carr | 261/90 |
| 2,079,117 A | * | 5/1937 | Hays | 261/30 |
| 3,004,403 A | * | 10/1961 | Laporte | 62/311 |
| 4,221,331 A | * | 9/1980 | Goran, Jr. | 239/121 |
| 5,620,633 A | * | 4/1997 | Junkel et al. | 261/28 |
| 5,667,732 A | * | 9/1997 | Lederer | 261/28 |
| 6,378,845 B1 | * | 4/2002 | Hsu | 261/28 |
| D544,078 S | * | 6/2007 | Geringer | D23/328 |

* cited by examiner

*Primary Examiner*—Scott Bushey
(74) *Attorney, Agent, or Firm*—Basil E. Demeur; Alan B. Samlan; David J. Hurley

(57) ABSTRACT

The present invention is directed to an improved handheld water misting fan device wherein the power source compartment is positioned within the device at a location remote from the fan motor thereby to remove any structure from the area bounded by the fan shroud. The relocation of the power source compartment leaves the area bounded by the shroud substantially unobstructed thereby to improve air flow. The device is formed in a dog bone shaped configuration to provide a narrow handle section for improved grippability, and an enlarged fluid reservoir at the lower end thereof for greater reservoir capacity.

8 Claims, 8 Drawing Sheets

HANDHELD WATER MISTING FAN WITH IMPROVED AIR FLOW

I. FIELD OF THE INVENTION

The present invention discloses an improved handheld water misting fan. More specifically, the present invention discloses a handheld version misting fan both rugged in construction and more stylish than conventional handheld water misting fan. The present invention improves upon one or more of the features which include air flow, fluid volume of the reservoir and grippability.

II. BACKGROUND OF THE RELEVANT ART

The water misting fan is a device for providing personal and environmental cooling by spraying atomized water droplets into an air stream. The droplets evaporate thereby drawing heat out of the surrounding air. Non-evaporated droplets impinge on the user and further evaporation draws heat out of clothing and skin of the user or surrounding surfaces. These are sometimes called "swamp coolers". For the benefit of the cooling, the cost is increased humidity, which can decrease comfort. Swamp coolers work poorly in confined or very humid environments and are more suited to hot, but low humidity, environments like the desert.

The utility of the device is improved by increasing the amount of water evaporated in the air stream as opposed to wetting the user and then trying to evaporate water off the skin and clothing. This is achieved by increasing the air flow and/or making water droplets smaller.

Portable units usually use a manually-actuated piston pump to generate the high pressures needed for fine atomization of the water. Portable water misting fans usually incorporate DC motors with dry cell batteries for portability.

In the art there are numerous instances of coupling a sprayer nozzle with a fan to produce an improved personal or environmental cooling apparatus. In the handheld realm, the portable misting fan described in Steiner '495 is the benchmark for the battery operated misting fans where a trigger or pushbutton operated sprayer discharges a fine mist of water into the air stream. These are typically single nozzle/single blower apparatuses.

In use, the user fills the reservoir through a fill port by removing the fill cap. Here, the port is large enough to accept ice cubes to keep the water in the reservoir cool. The user squeezes the pump trigger to manually pump water from the reservoir to moderate pressures through a narrow orifice on the nozzle. The water comes out as a spray of droplets. An electric motor driven fan is located proximate to the nozzle. There is typically an enclosure that surrounds the batteries, motor and pump body. Here the fan body is supported on the sprayer which, in turn, mounts to the top of the bottle. If the nozzle is located behind the fan blades, and the fan is turned on, the droplet spray will be directed into the air stream to be directed at the user and to enhance evaporation. The fan can be operated independently of the pump so the unit can act in a fan-only capacity.

In the case of designs such as Steiner '495, the water misting fan exhibits a problem with aesthetics and durability. Durability is an important feature because these products are sold for outdoor use and at amusement parks where they don't receive tender care. Also, as with any consumer good, the aesthetics are important to achieve greater customer satisfaction and commercialization of the product.

The durability problem comes from the interface between the reservoir, sprayer and the fan enclosure. At some point, there is a coupling between the motor enclosure and sprayer (further attached to the reservoir) or motor enclosure and reservoir that ends up being a weak link. The coupling has to be undone and reattached for various purposes of changing the batteries, filling the reservoir or removing the fan for separate use. If these couplings could be removed, the water misting fan could be made much more durable.

Further, conventional water misting fans have vulnerable triggers and attachment collars where the sprayer mates with the top of the bottle. These are two areas where the end user tends to break the misting fan. As such, the fan should be evaluated for its durability by evaluating how it performs in drop testing, how it holds up when packed away in a purse or beach bag, and the strength of its attachment points like straps and belt clips.

The aesthetic problem comes from the compromises of the separable component design. In the instance of portable bottle type misting fan designs, there is an unsightly, cheap-looking screw collar that detracts from the smooth lines of the fan head. Similarly, the use of the standard sprayer requires the use of the blocky nozzle and cheap-looking trigger that detract from the overall design. The design does not allow us to hide the chunky-looking sprayer and nozzle within the enclosure because of size and functional reasons. The grip is often uncomfortable because it is too large around for smaller hands or the weight is not well balanced.

What is lacking in the prior art is a water misting fan that can withstand the rigors of outdoor use while still looking sleek and stylish. The design should also store compactly and possess a minimum of parts that can be lost. Moving or wearing parts should be kept to a minimum. The handle or grippable feature of the enclosure should be narrow enough for smaller hands to grasp and the trigger should be located conveniently to the index finger and not pinch adjacent fingers.

Further, to be economical, the design should have a minimum number of seals and as many integrated components as possible, these using economical injection molding or blow molding to render the features. For performance, it has been found that a flexible fan blade without any guard in front or back provides better air flow without compromising user safety. A guard around the periphery of the impeller improves durability. Other considerations of the misting fan design should make efficient use of the space inside the enclosure, especially to maximize reservoir volume.

Further, it has now been determined that by re-locating the battery compartment to a location removed from air flow stream created by the impeller blade, air flow is improved. This is especially realized in the variation of the portable misting fan which includes a shroud surrounding the impeller blades which serves the function of protecting the impeller blades from breakage and protects the user from possible injury from the impeller blades.

The present device re-locates the battery compartment to a separate compartment which may be positioned in the base of the shroud, or to a separate compartment which may be formed in the wall of the reservoir.

The reservoir may be formed as a separate compartment which is then surrounded by a handle portion and includes an enlarged neck portion which extends outwardly from a bottom opening in the handle portion. The lower portion of the reservoir and surrounding handle portion is enlarged which serves a two-fold purpose of improving the fluid volume of the reservoir and providing a dog-bone shaped configuration allowing for improved grippability.

IV. BRIEF DESCRIPTION OF DRAWINGS

Reference will now be made to the attached drawings, when read in combination with the following detailed description, wherein like reference numerals refer to like parts throughout the several views, and in which.

VI. DETAILED DESCRIPTION OF THE PREFERRED EMBODIMENT

Figure 1:
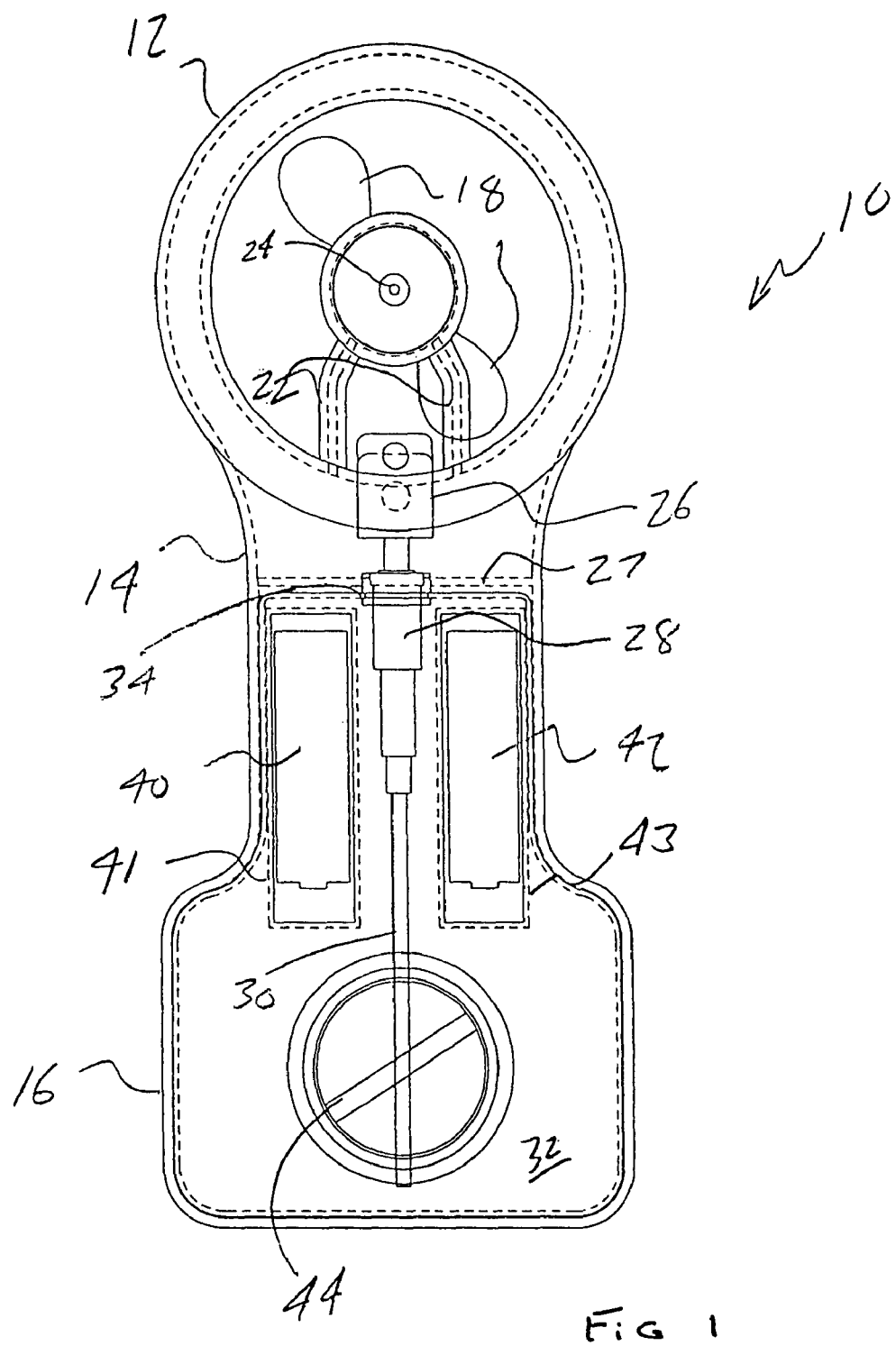
FIG. 1 is a front view of the water misting fan according to a preferred embodiment of the present invention and showing interior portions of the enclosure and reservoir in phantom.

Referring now to FIG. 1, a front view is shown at 10 of an improved water misting fan according to a first preferred embodiment of the present invention. As will be subsequently described, the illustrations provided herein consist of front and side views in two-dimension, and which show various internal components in phantom.

Figure 2:
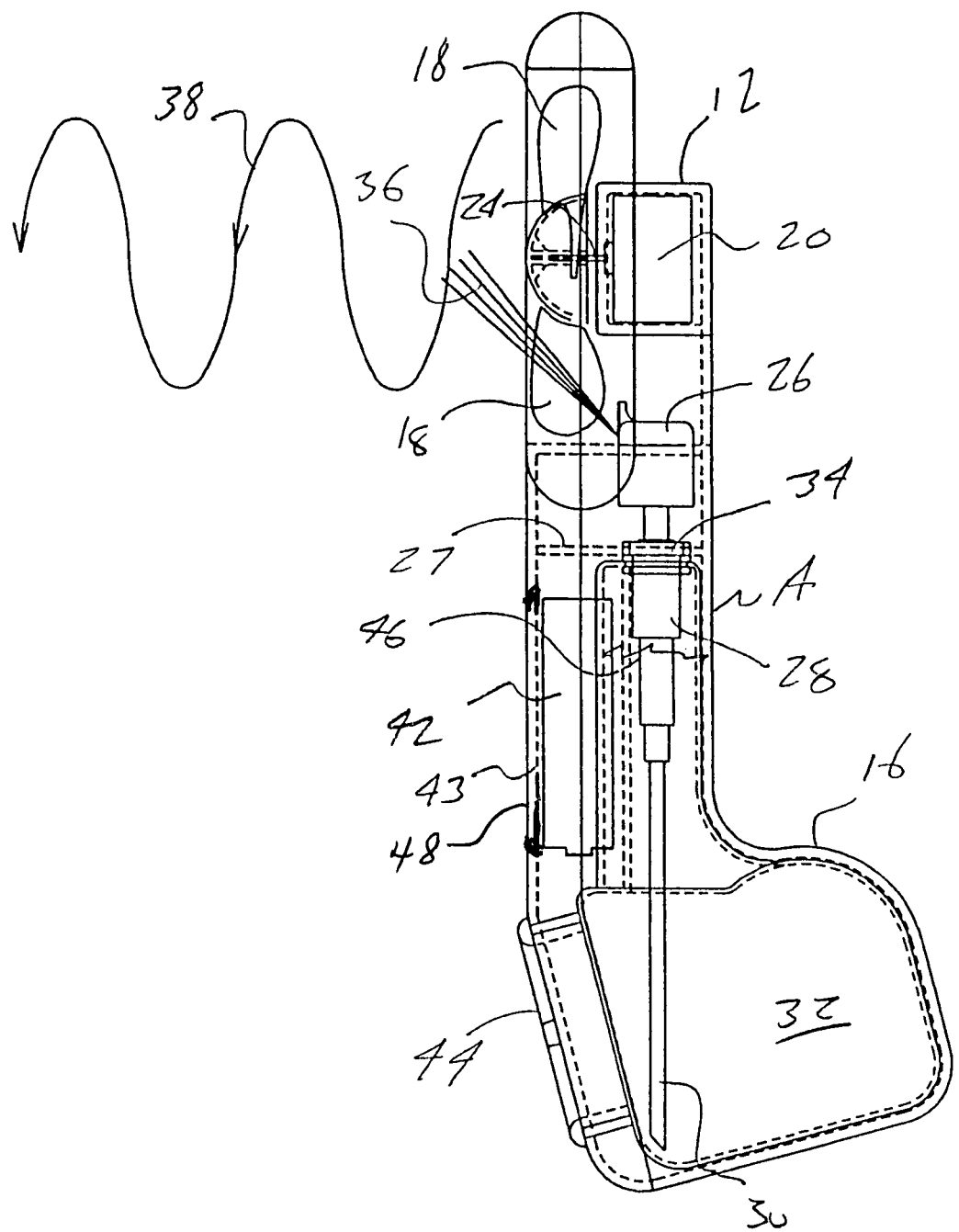
FIG. 2 is a side view of the water misting fan shown in FIG. 1 and illustration in particular the upwardly angled nature of the nozzle generated mist stream in use with the rotating impeller elements.
Figure 3:
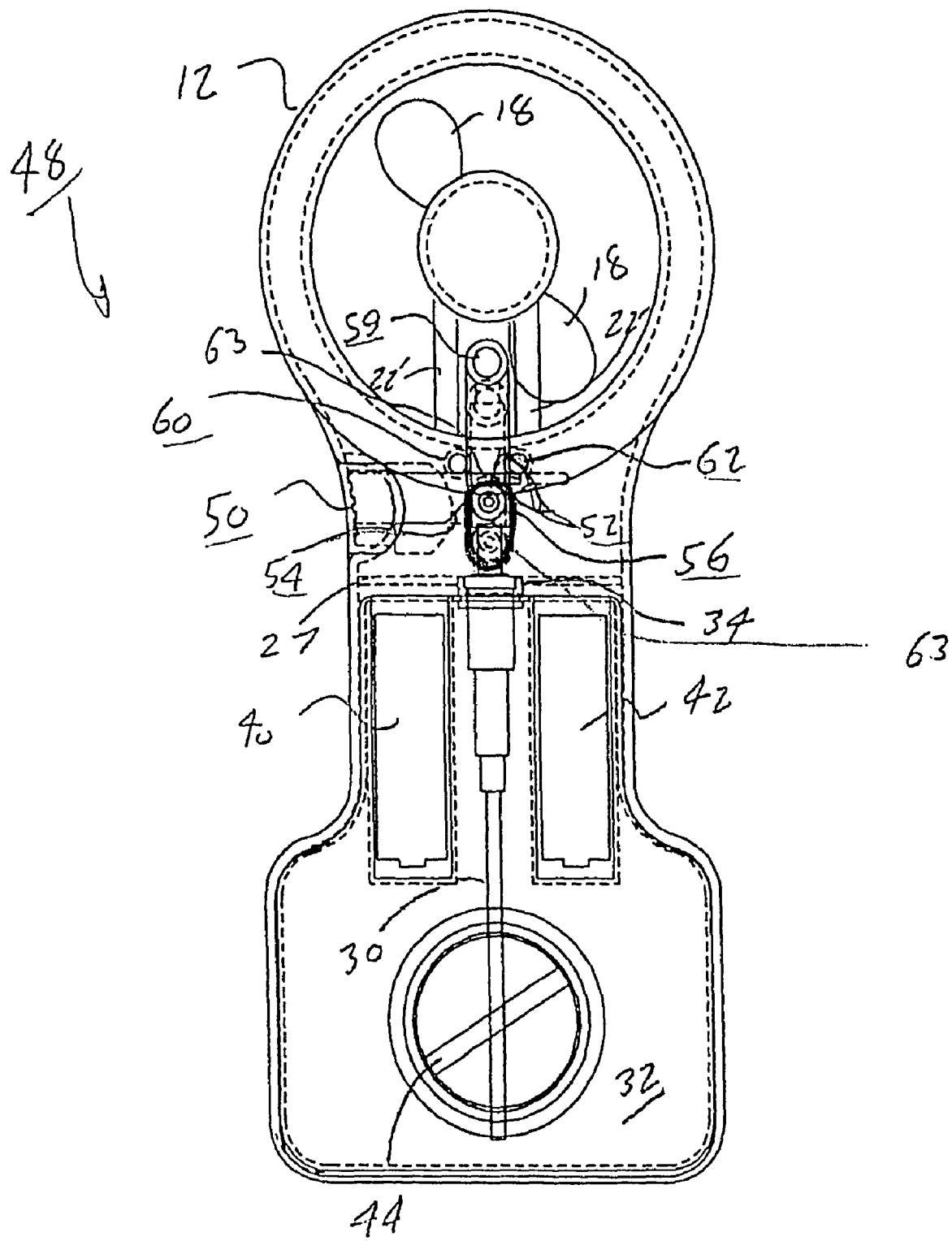
FIG. 3 is a front view of a water misting fan according to a secondary embodiment illustrating an inwardly depressible actuator button for generating the mist spray according to the present invention.
Figure 4:
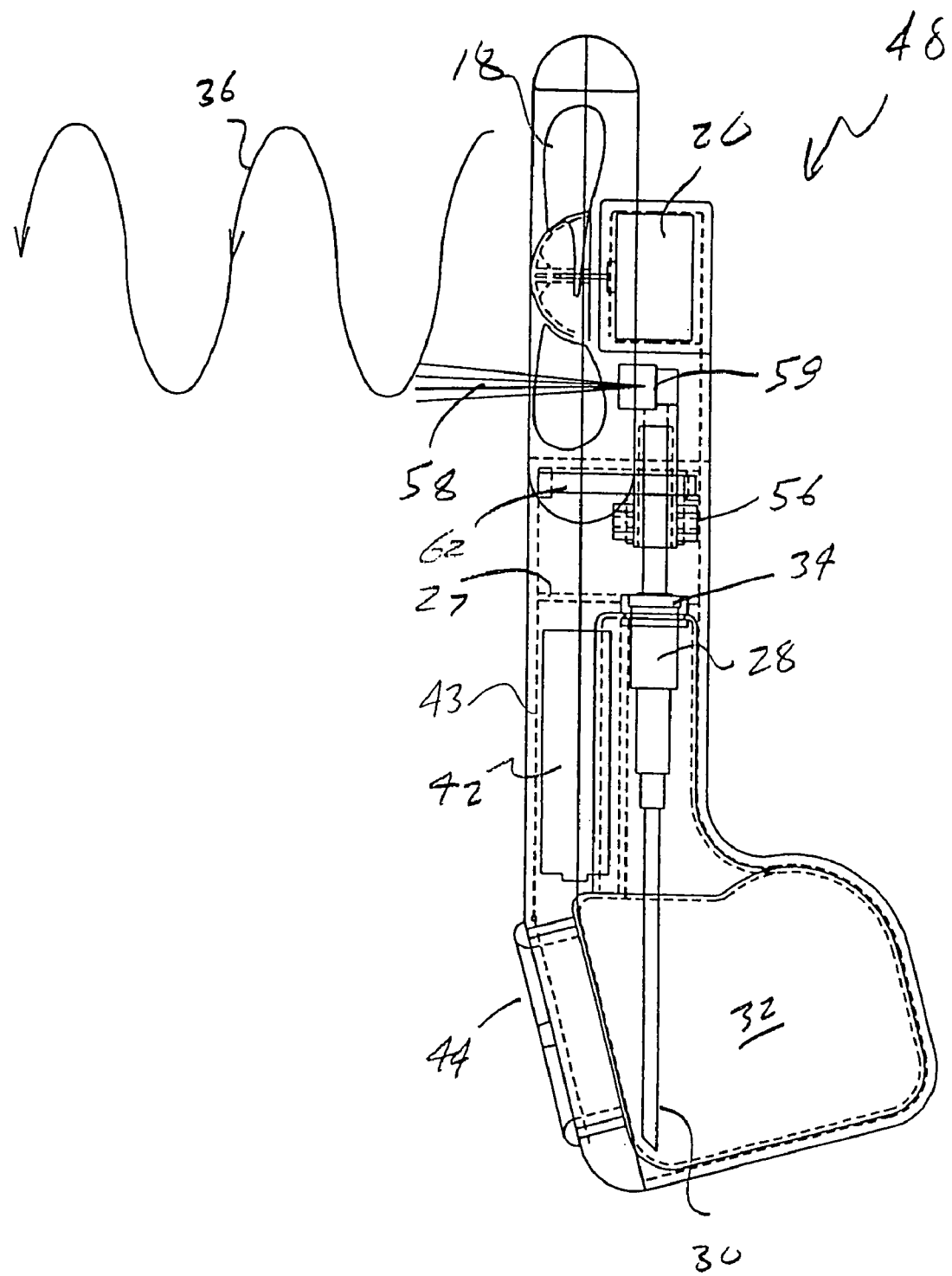
FIG. 4 is a side view of the water misting fan according to FIG. 3 and illustrating the nozzle directing the mist from a rearward position.
Figure 5:
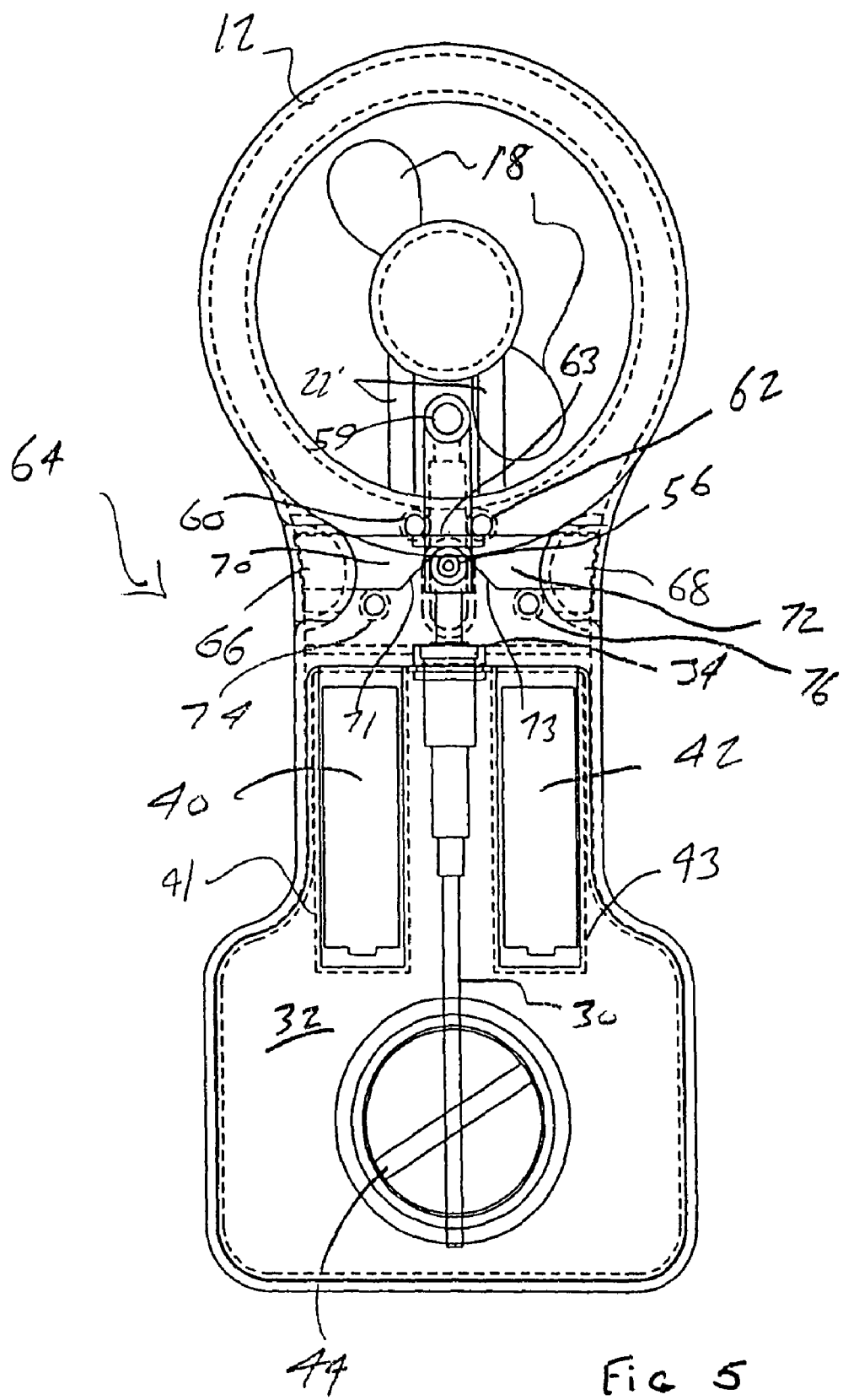
FIG. 5 is a front view of the water misting fan according to a third embodiment incorporating a pair of opposingly and inward actuating buttons, either of which is actuable to issue a mist spray.
Figure 6:
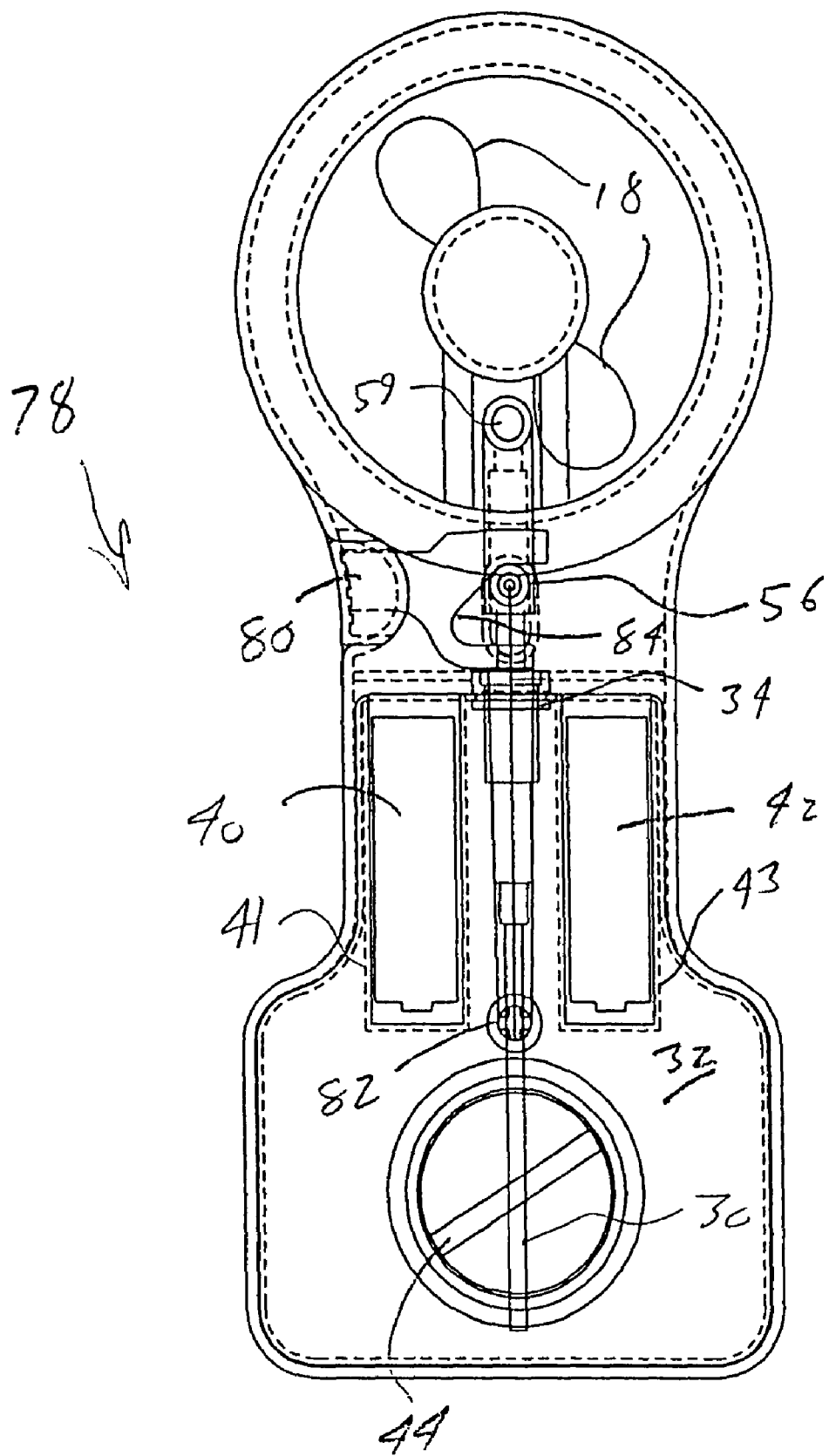
FIG. 6 is a front view of the water misting fan according to a still further variant illustrating a pivoting actuator button arrangement by which a cam surface is formed in an associated and inward guiding portion in order to downwardly deflect the spray nozzle.

Referring again to FIG. 1, as well as to the side view of FIG. 2, a main body of the misting fan 10 is typically constructed of a one-piece and integral body and includes an upper shroud portion 12, an intermediate neck portion 14 and a lower fluid reservoir holding portion 16. Encased within the shroud is a rotating impeller (see pair of blades 18) driven by a rearwardly mounted motor 20. A pair of motor supports (or struts) 22, see FIG. 1, support the motor 20. A pair of motor supports (or struts) 22, see FIG. 1, support the motor 20 and associated impeller, see further motor drive shaft 24 (FIG. 2), and are configured to exhibit a minimal cross section so as to minimize impeding air flow to the rear side of the impeller blades 18.

An actuator button 26 is illustrated at an intermediate mounting location, see interior shelf 27, associated with the body interior and is accessible, from the rearward side of the open shroud 18, and in order to be downwardly actuated (see to phantom illustration in FIG. 1) in order to issue a mist spray. A misting assembly further includes a pump 28 and downwardly directed fill tube 30 extending within a lower enclosed water holding reservoir 32.

A grommet 34 is fixedly secured at an interior and intermediate shelf location of the body such that the upwardly extending actuator button 26 is positioned atop the intermediate portion. In use, and upon downwardly actuating the button 26, a resultant spray mist pattern 36 is created at an upwardly angled direction and relative to a forwardly generated air path, see arrow 38, in order to create the desired evaporative cooling effect.

A pair of batteries (e.g. AA sized alkaline) 40 and 42 are supported within mating recess configured nesting area, see at 41 and 43 in FIG. 1, located within the intermediate portion 14 of the body and hence positioned at a location removed from the fan motor. Although not shown in three dimensions, it is understood that a suitable cover element is provided for sealing the batteries within the nesting areas provided in the body. Although not shown for purposes of clarity and ease of illustration, electrical connections are provided from a terminal location of the batteries 40 and 42, and in order to provide power to the electrically operated fan motor 20. An on/off switch is positioned in electrical contact with the batteries, at a suitable location along the body.

As will be appreciated from a view of FIG. 1, the re-location of the battery nesting areas 41 and 43 respectively (battery compartments) into the reservoir area 32 leaves the opening around the blades 18 relatively unobstructed. Hence, upon actuation of the blades 18, the air flow created by the blades 18 is improved since there is no bulky structure to impede the air flow.

Reviewing FIGS. 1 and 2 collectively, the narrow intermediate location 14 serves as the handle for the assembly. Further noted is the provision of a fill cap 44 along a front face of the fluid reservoir holding bottom 32 and which, upon rotating the body to a horizontal position, allows for refilling of the reservoir 32.

A gasket seal (not shown) is provided for establishing a watertight seal upon the rotatable tightening of the cap 44 and, upon removal of the same, creates a suitably sized opening (such as 40 mm or greater) to allow for refilling ice cubes or the like within the fluid holding reservoir 32. The end user can further grasp the fill port on the finger hold to remove the cap (by one of several means: unscrewing, pulling off an interference fit, partial turn and pull as with a bayonet mount). Also, the user can fill the water from a tap or add ice through the port.

As is also known, the user can install the batteries 40 and 42 into the enclosure 41 and 43 respectively, the batteries again being noted as kept aligned by the recess features on the reservoir and alignment features on the battery cover. As shown in FIG. 2, a battery cover 48 is provided which overlies the nesting areas or battery compartments 41 and 43. The battery cover 48 is configured to follow the contour of the intermediate neck or handle portion 14. Further, the piston pump 28 is partially immersed in a top fill location, see at 46 in FIG. 2, of the reservoir and is also held in place by the grommet 34 which also seals between the opening in the reservoir 32 and the outside (above-side) of the pump body.

It will also be observed that the reservoir 32 exhibits a thin wall construction and follows closely the inner surface of the enclosure forming the handle portion and the batteries (these forming a battery nest). It is understood that the reservoir 32 can exhibit a thinner wall than in prior art designs wherein the reservoir is located external to the motor (or any) enclosure. This has the advantage of reducing the likelihood of breaking and leaking.

As is also shown, the fan blades 18 are protected by a shroud 12 and which, in the illustrations provided, forms an extension of the enclosure. In the preferred design, the shroud 12 should come close to the surface defined by the revolution of the leading and trailing edges of the fan blades 18, however not touching it. It is also envisioned that the shroud 12 should extend as far forward (see again side view of FIG. 2) as the furthest downstream portion of the impeller, and should further extend rearward (at least) as the further upstream portion of the impeller.

Figure 7:
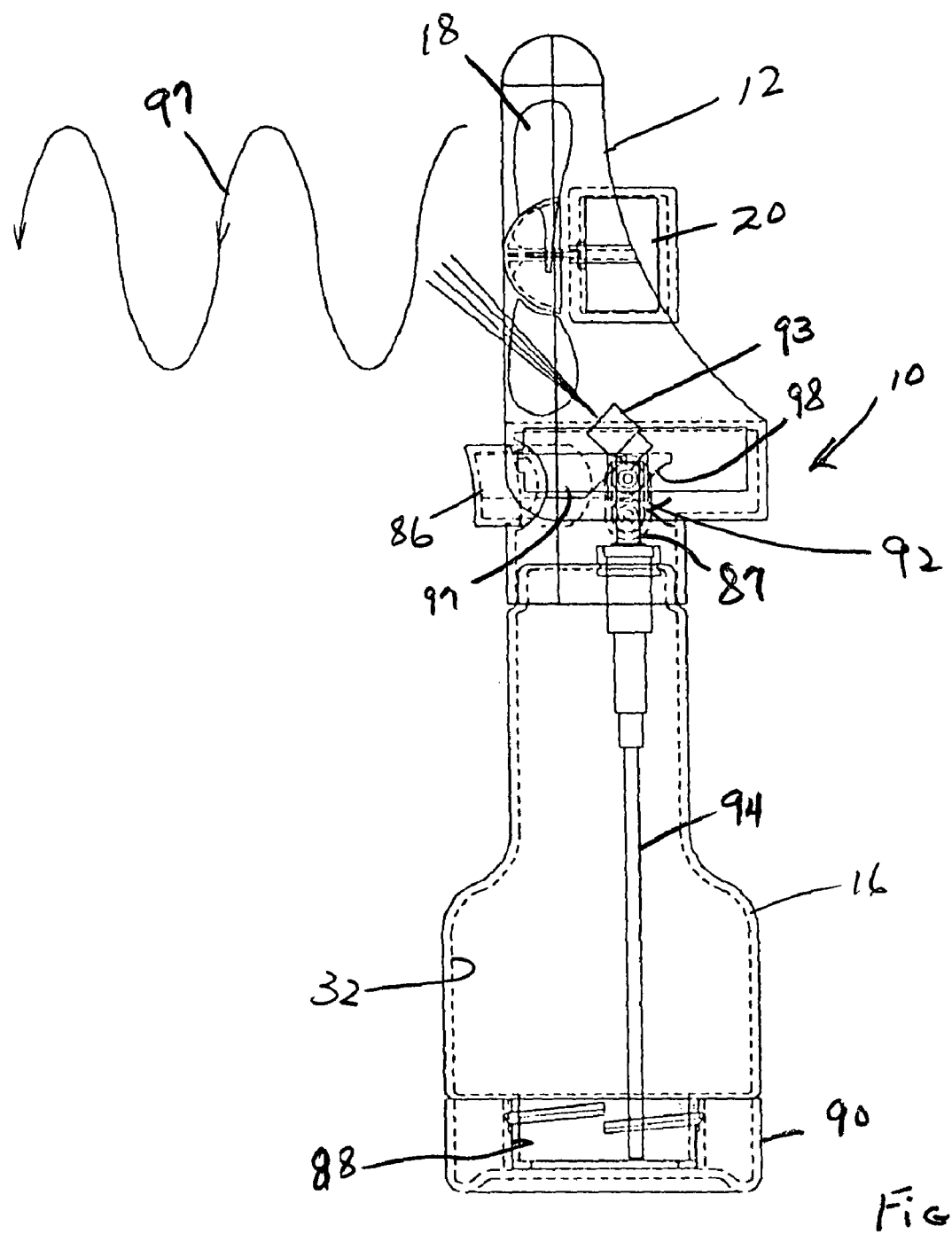
FIG. 7 is a side elevational view in cross section illustrating an alternate embodiment of a fan device having the battery compartment located in the base of the shroud.
Figure 8:
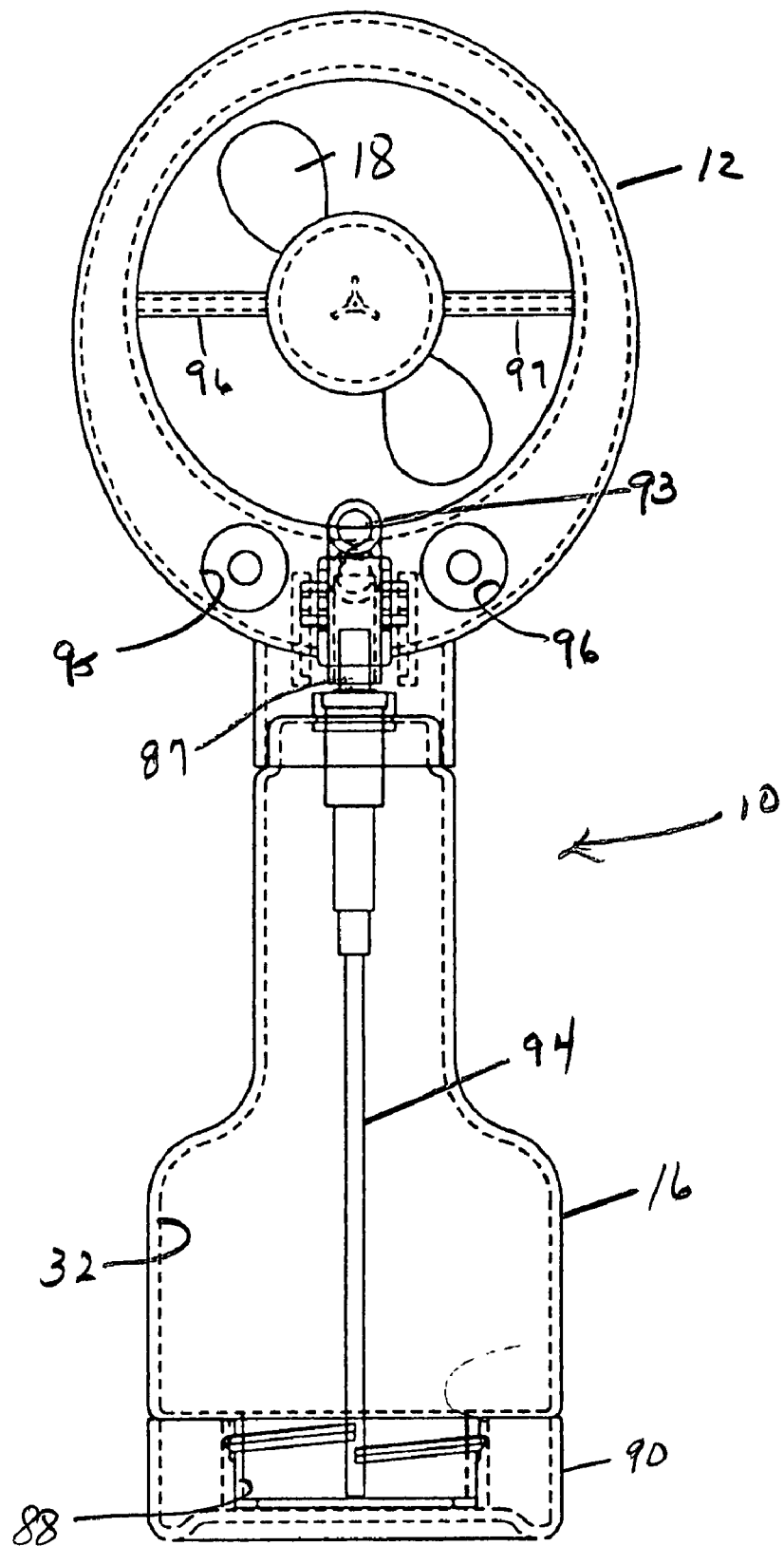
FIG. 8 is a front elevational view partly in cross section showing the device of FIG. 7 and the positioning of the battery compartment in the base of the shroud.

As again shown in FIG. 2, the upwardly angled stream of mist generated by the nozzle 26 is located in the periphery surrounding the impeller blades 18. Also, again noted is the nesting of the batteries 40 and 42 in the battery compartments 41 and 43 located within the reservoir 32. Further shown is an idealized representation of the air flow coming off the impeller blades, again at 38, and which is highly collimated with a minimum of radial velocity. It is conceived that this variant would be assembled from front and rear halves to make one enclosure for the batteries, reservoir, motor and pump.

Referring now to FIGS. 3 and 4, shown at 48 is a second variant of handheld water misting fan according to the present invention. A number of the features illustrated in the embodiment of FIGS. 3 and 4 are substantially identical to that shown in the first disclosed embodiment of FIGS. 1 and 2 and, accordingly, include identical reference numerals and are not repetitively described.

In FIGS. 3 and 4, an actuator button 50 is not attached to an associated nozzle body and pump discharge tube. Instead, an inwardly directed portion of the button 50 is exhibited by upper 52 and lower 54 cam surfaces, which are inwardly displaced by the inward (such as spring depressing) of the interconnected button 50 (see solid and phantom illustrations respectively in FIG. 3). The shaping of the motor supports is further modified, as shown at 22', from that shown in FIGS. 1 and 2.

When actuated inwardly by the button 50, the guiding cam surface 52 co-acts against an idler 62 located in a central, forward facing and intermediate location of the body whereas a lower cam surface 54 co-acts against nozzle idler (button) 50. This operates the pump idler 56 which, when downwardly depressed, discharges a mist spray 58 (see FIG. 4) from an associated nozzle 59 into the air stream 36 (in this instance, located upstream of the blades 18 and discharged in a forward direction). The direction of the mist spray in this variant is substantially forward however, it can be angled or otherwise oriented relative to the rotating impeller blades 18.

Other considerations include idler supporting elements (see at 60 and again at 62) affixed within the body to ensure straight line motion upon the idler by co-acting upon the upper cam surfaces (see at 63 in FIG. 3) on the respective actuator buttons (66 and 68 as also shown in FIG. 5) being downwardly actuated. In this manner, the pump actuator button wedges itself (with the cam surfaces 52 and 54 on the top and bottom, respectively of the actuator) between the idlers on the nozzle body and the idlers on the enclosure to facilitate smooth mechanical motion and to prevent wedging or sticking of the assembly in use. Also noted is oblong shaped guide track 63 in FIG. 3 and which facilitates up/down movement of the nozzle idler 50 in a straight line.

FIG. 4 again shows this second variant from the side. Note is made of the nozzle 59 directing the mist from behind the impeller blades. The nozzle body further should be narrowed to minimize obstructing the air flow into the impeller 18. Otherwise the details are similar to that shown in the primary embodiments of FIGS. 1 and 2.

FIG. 5 illustrates at 64 a subvariant of the design of FIGS. 3 and 4, in which a pair of actuator buttons 66 and 68 are provided secured to opposite intermediate sides of the body, and which can independently operate the nozzle 59 and pump (see idler 56) from opposite sides of the enclosure. Each of the actuator buttons 66 and 68 again includes an inwardly directing portion, see at 70 and 72 respectively, each having an inwardly angled cam surface 71 and 73, these guided by the nozzle idler 56 via mounted supports, again at 60 and 62, as well as further at 74 and 76, working against the idlers on the enclosure and nozzle body and in order to direct the downwardly spray issuing action of the idler 56 guided thereby.

It is further understood that the geometry of the idlers is such that they would have to be suitably wide to allow the left and right (or front and back) actuator buttons to bypass each other. As such, this makes the device suitable for both right and left handed persons. It is further noted that the actuators could be left/right oriented or front/back oriented, according to the desires of the designer.

Referring finally to FIG. 6, illustrated at 78 is a yet further variant of the handheld water misting fan, and in which a modified actuator button 80 does not slide, but rather pivots about an axis 82 as distant as feasible within the enclosures (see as centrally located within the lower reservoir holding compartment) from the idler 56 on the nozzle body. A uniquely configured cam surface 84 is defined in inwardly extending fashion from the actuator button 80, and such that the nozzle body idler 56 is caused during co-acting contact to move in an arc, rather than straight line. This construction eliminates the need for an idler positioned on the enclosure to guide the button, assuming further that the actuator button is made suitably larger and longer to permit near-straight-line motion.

Additional considerations include an associated on/off switch (again not shown) constructed of any conventional type like alternate action pushbutton, slide or toggle, further such that anyone skilled in the art could select and locate in a satisfactory location the correct switch. Other considerations also include a variety of ways to provide for a fill cap, a suitable one of which capable of being selected based on requirements by someone skilled in the art.

It is also understood that the term "idler" is interpreted to include by definition a wheel and axle type mechanism, or simply a smooth rounded surface that minimizes the amount of friction between the cams and the idler. The idlers can also preferentially be configured upon the surface or dispersed at some location within the base material and may further exhibit any of a number of lubricating elements such as wax, silicone, Teflon or molybdenum disulphide.

FIGS. 7 and 8 of the drawings illustrate still a further variation of an embodiment of the present invention. Again, the misting fan 10 includes a shroud portion 12 surrounding the blades 18, the blades 18 operated by a motor 20. The lower portion 16 provides a chamber which forms the reservoir 32 shown to include a lower extending neck portion 88 which forms the fill port for the reservoir 32. The neck portion is adapted to receive a fill cap 90 in fluid sealing engagement in a manner well known in the art. It will be appreciated that the neck portion 88 provides the fill port for the fluid reservoir may be an enlarged fill port to accommodate the insertion of both water and ice. The pump assembly 92 as provided, includes a nozzle 93 at its upper end, and receives fluid from the reservoir 32 via the dip tube 94.

In this embodiment, a pair of compartments 95 and 96 respectively are provided in the lower section of the shroud portion 12. Appropriate electrical connections are provided to the motor 20 through the interior of the shroud portion 12, and through the motor supporting struts, 96 and 97 respectively. It will be appreciated in this embodiment that the battery compartments 95 and 96 are located in the lower portion of the shroud 12, and therefore beneath the blades 18. It is therefore clearly understood that the air stream 97 created by the blades 18 is unimpeded since there is no bulky structure formed either forwardly or rearwardly of the blades 18. FIG. 8 clearly shows that the area within the shroud 12, is unimpeded, and therefore the air flow created by the blades 18 is enhanced and improved. Further illustrated in FIGS. 7 and 8, is the actuator button 26 which will operate the pump piston 87 by means of a back plate 97 having a cam surface 98, all in the manner as previously described. In viewing FIG. 8, it will be appreciated that the actuator button 26, the back plate 97, nozzle 93 and pump assembly 92 may be located between the battery compartments 95 and 96 respectively. In this manner, the actuator button 26 is centrally located to the fan device unit 10, and permits operation by both right-handed and left-handed operators.

FIGS. 7 and 8 further illustrate the fact that by having a dog-bone shape configuration for the fan device 10 from top to bottom, the grippability of the device 10 is improved such that smaller hands may have the ability to grasp the device, and which permits both left-handed and right-handed operation. It further illustrates that the dog-boned shape configuration permits the lower portion of the fluid reservoir to be enlarged thereby improving the fluid reservoir capacity while still providing a relatively stream-lined device. The neck portion 88 which extends out through an opening 89 in the lower portion 16 allows the operator to insert the both water, and ice into the fluid reservoir 32.

It will be appreciated from the above description that the ability to improve the air flow as generated by the fan blades, and to maximize reservoir capacity, as well as improving grippability is achieved by the redesigning and reconfiguration of the various parts and elements of the fan device in the present invention. Hence, the relocation of the battery compartments away from the motor housing which operates the fan to a remote location, is either in the base of the shroud as illustrated in FIGS. 7 and 8, or formed in the wall of the reservoir 32. Hence, the area around the fan blades remain unimpeded and provides a clear path for air flow through the shroud. The dog-bone shape configuration permits the reservoir to be enlarged at the lower end of the device, while minimizing the space located in the intermediate portion of the device. The narrower intermediate portion permits easy grippability by the operator while enlarged lower portion permits the reservoir to achieve greater capacity.

While there has been disclosed what is at present to be considered the preferred embodiments of the invention, various modifications may be made therein without departing from the true spirit and scope of the invention as set forth in the appended claims.

| | |
|---|---|
| 0 | |
| 1 | |
| 2 | |
| 3 | |
| 4 | |
| 5 | |
| 6 | |
| 7 | |
| 8 | |
| 9 | |
| 10 | misting fan |
| 11 | |
| 12 | shroud portion |
| 13 | |
| 14 | neck portion |
| 15 | |
| 16 | lower portion |
| 17 | |
| 18 | blades |
| 19 | |
| 20 | motor |
| 21 | |
| 22 | motor struts |
| 23 | |
| 24 | drive shaft |
| 25 | |
| 26 | actuator button |
| 27 | interior shelf |
| 28 | pump |
| 29 | |
| 30 | fill tube |
| 31 | |
| 32 | reservoir |
| 33 | |
| 34 | grommet |
| 35 | |
| 36 | spray mist pattern |
| 37 | |
| 38 | air path pattern |
| 39 | |
| 40 | battery |
| 41 | nesting area |
| 42 | battery |
| 43 | nesting area |
| 44 | fill cap |
| 45 | |
| 46 | piston pump location |
| 47 | |
| 48 | battery cover |
| 49 | |
| 50 | actuator button |
| 51 | |
| 52 | upper cam surface |
| 53 | |
| 54 | lower cam surface |
| 55 | |
| 56 | pump idler |
| 57 | |
| 58 | mist spray |
| 59 | nozzle |
| 60 | idler supporting element |
| 61 | |
| 62 | idler |
| 63 | upper cam surface |
| 64 | |
| 65 | |
| 66 | actuator button |
| 67 | |
| 68 | actuator button |
| 69 | |
| 70 | inwardly directed portion |
| 71 | cam surface |
| 72 | inwardly directed portion |
| 73 | cam surface |
| 74 | idler support |
| 75 | |
| 76 | idler suppport |
| 77 | |
| 78 | |
| 79 | |
| 80 | actuator button |
| 81 | |
| 82 | axis of 80 |
| 83 | |
| 84 | cam surface |
| 85 | |
| 86 | actuator button |
| 87 | pump piston |
| 88 | neck portion |
| 89 | opening in bottom |
| 90 | fill cap |

-continued

| | |
|---|---|
| 91 | |
| 92 | pump assembly |
| 93 | nozzle |
| 94 | dip table |
| 95 | battery compartment |
| 96 | battery compartment |
| 97 | back plate |
| 98 | cam surface |
| 99 | |
| 100 | |
| 101 | |
| 102 | |
| 103 | |
| 104 | |
| 105 | |
| 106 | |
| 107 | |
| 108 | |
| 109 | |
| 110 | |
| 111 | |
| 112 | |
| 113 | |
| 114 | |
| 115 | |
| 116 | |
| 117 | |
| 118 | |
| 119 | |
| 120 | |
| 121 | |
| 122 | |
| 123 | |

The invention claimed is:

1. A portable misting and cooling fan device of the type formed by a body including a lower handle section and an upper head section, the lower handle section accommodating a fluid reservoir and the upper head section including a fan device operated by a fan motor and surrounded by a protective shroud having an upper end and a lower end, and fan actuator means and a misting nozzle, the misting nozzle being in fluid communication with the reservoir through pump means for pumping fluid from the reservoir to the misting nozzle, the pump means having actuator means for actuating the pump means, and the misting nozzle being positioned in the head section to deliver a stream of misted fluid into the air stream created by the fan device, the improvement comprising, a power source compartment for accommodating a power source therein, said power source compartment being positioned within the device in a location remote from the fan motor, the area bounded by the shroud being substantially free of any structure thereby to maximize the air flow path therethrough, and the lower handle section having a relatively narrow intermediate portion forming a gripping handle, and an enlarged lower portion to form an enlarged fluid reservoir.

2. The portable cooling and misting fan device as set forth in claim 1 above, wherein said power source compartment is formed as a portion of the fluid reservoir and is fluid sealing relationship relative to said fluid reservoir, and said handle section having an access panel formed therein, said access panel formed to overlie said power source compartment thereby to provide access to said power source compartment, and said access panel being configured and contoured in order to conform to the configuration of said handle section.

3. The portable cooling and misting fan device of the type set forth in claim 1 above, wherein said power source compartment is formed within the lower section of the shroud and below the area bounded by the shroud, whereby said power source compartment is removed from the area bounded by the shroud and leaves the area bounded by the shroud to be substantially unobstructed.

4. The portable cooling and misting fan device as set forth in claim 3 above, wherein said shroud includes an access panel formed to overlie said power source compartment thereby to provide access to said power source compartment.

5. The portable cooling and misting fan device as set forth in claim 1 above, wherein the shroud is formed by a body having a hollow interior, and electrical communication is established as between said power source compartment and the fan motor by providing the appropriate electrical contacts in the hollow body of the shroud thereby to provide power to the fan motor.

6. The portable cooling and misting fan device as set forth in claim 1 above, wherein the handle section is provided with an opening formed at the bottom thereof, and the fluid reservoir includes a neck portion which extends through said opening thereby to provide a fill port, said fill port being sufficiently large to permit the insertion of ice and fluid therethrough, and said fill port, accommodating a fill cap enclosed said fill port in fluid tight relationship.

7. The portable cooling and misting device as set forth in claim 1 above, wherein the actuator means comprises a pair of actuator buttons positioned on opposed sides of the upper head section, each one of said actuator buttons having an inwardly directed portion, said inwardly directed portion having an inwardly angled cam surface, and said nozzle includes nozzle idlers, said cam surface working against said nozzle idlers thereby to operate the pump assembly, each one of said pair of actuator buttons being operable in a plane from one another, whereby the pump assembly may be operated from either side of the device.

8. The portable cooling and misting device as set forth in claim 1 above, wherein the actuator means comprises an actuator button, said actuator button having an inwardly directed portion having a cam surface, the nozzle having a nozzle idler, and said actuator button is positioned to pivot about an access distant from said nozzle idler, whereby depression of said actuator button causes said nozzle idler to move in an arch.

* * * * *